United States Patent
Schneider et al.

(10) Patent No.: US 6,948,071 B2
(45) Date of Patent: Sep. 20, 2005

(54) METHOD FOR ACTIVATING OR DEACTIVATING DATA STORED IN A MEMORY ARRANGEMENT OF A MICROCOMPUTER SYSTEM

(75) Inventors: Klaus Schneider, Ludwigsburg (DE); Ralf Angerbauer, Stuttgart (DE); Alexander Heindl, Vienna (AT)

(73) Assignee: Robert Bosch GmbH, Stuttgart (DE)

(*) Notice: Subject to any disclaimer, the term of this patent is extended or adjusted under 35 U.S.C. 154(b) by 347 days.

(21) Appl. No.: 10/159,214

(22) Filed: May 31, 2002

(65) Prior Publication Data

US 2003/0018905 A1 Jan. 23, 2003

(30) Foreign Application Priority Data

May 31, 2001 (DE) .......................................... 101 26 451

(51) Int. Cl.[7] .............................................. G06F 13/00
(52) U.S. Cl. ..................................... 713/193; 713/200
(58) Field of Search ................................. 713/193–202, 713/176; 705/56; 380/28, 30

(56) References Cited

U.S. PATENT DOCUMENTS

| | | | |
|---|---|---|---|
| 5,768,390 A | | 6/1998 | Coppersmith et al. |
| 5,774,544 A | | 6/1998 | Lee et al. |
| 5,828,751 A | * | 10/1998 | Walker et al. ............... 713/175 |
| 6,032,257 A | * | 2/2000 | Olarig et al. ................ 713/200 |
| 6,138,236 A | * | 10/2000 | Mirov et al. ................. 713/200 |
| 6,314,409 B2 | * | 11/2001 | Schneck et al. .............. 705/54 |

FOREIGN PATENT DOCUMENTS

DE 197 23 332 9/1998

OTHER PUBLICATIONS

MIPS Technology PR, "MIPS Technologies Introduces Secure Licensable Processor Core", Nov. 4, 2002, http://microcontroller.com/news/printer_mips_licenses_secure_core_4ksd.asp , entire document.*

Atmel Corp., "32-bit Secure Microcontroller for Smart Cards", 2003, http://www.atmel.com, entire document.*

K. Pommerening, "Krptogrphische Basistechniken" http://www.uni-mainz.de/~pommeren/DSVorlesung/KryptoBasis/asymmetrisch.html**.

* cited by examiner

Primary Examiner—Ayaz Sheikh
Assistant Examiner—Ronald Baum
(74) Attorney, Agent, or Firm—Kenyon & Kenyon

(57) ABSTRACT

A method is for activating or deactivating at least one part of data stored in a memory arrangement of a microcomputer system, in particular one part of a program stored there. In the event of a manipulation of data stored in the memory arrangement by unauthorized third parties, a method having the following method steps may prevent utilization of the manipulated data reliably and effectively:

a microcomputer-individual identifier is stored in a signed or encoded fashion a specifiable memory area of the memory arrangement;

when the microcomputer system is started up, the signature of the identifier is checked or the identifier is decoded; and as a function of the result of the identifier, one part of the data is activated or deactivated.

17 Claims, 3 Drawing Sheets

METHOD FOR ACTIVATING OR DEACTIVATING DATA STORED IN A MEMORY ARRANGEMENT OF A MICROCOMPUTER SYSTEM

FIELD OF THE INVENTION

The present invention relates to a method for activating or deactivating at least one part of data stored in a memory arrangement of a microcomputer system, in particular one part of a program stored there.

In addition, the present invention relates to a microcomputer system having one computing unit, in particular a microprocessor, and a memory arrangement in which data, in particular a program, is stored.

BACKGROUND INFORMATION

Conventional methods exist to protect data stored in a memory arrangement of a microcomputer system, in particular to protect a program stored there against manipulation. Such methods are used, for example, to prevent an unauthorized manipulation of a control program stored in a control unit of a motor vehicle or of data stored there. The control program controls or regulates specific functions in the motor vehicle, for example, an internal combustion engine, an electronic stability program, an antilock braking system (ABS) or an electronic steering system (steer-by-wire). A manipulation of the control program may result in a defect of the controlled or regulated unit of the motor vehicle. For that reason, manipulation of the control program or of the data should be prevented if possible; at the least however, it should be possible to recognize the manipulation in retrospect so that the cause of a defect of a controlled or regulated unit may be determined or warranty claims may be correctly assigned with it.

Despite the danger of a manipulation of the control program or of the data by unauthorized persons, it may not make sense to completely prohibit access to the memory arrangement of the control unit. In order, for example, to be able to reprogram the control unit, authorized users may need to gain access to the memory arrangement. It may be necessary, for example, to store a new version of a control program or new parameters or limit values in the control unit from time to time in order, for example, to eliminate errors in the software or to take new legal requirements into account.

In automotive control units, a distinction may be made between series units and application units. Control units are normally delivered as series units after production. In series units, mechanisms are activated to check a manipulation of the data stored in the memory arrangement of the control unit. These mechanisms may recognize the manipulated data so that the data may be blocked. The mechanisms may be of a diverse configuration. Various conventional check mechanisms may exist. In certain situations, in particular during the development and testing phase of the control units, it may be necessary to deactivate the check mechanisms so that various data may be stored rapidly and easily in the memory arrangement. A control unit with deactivated check mechanisms is identified as an application unit.

To ensure complete test coverage of the data stored in the memory arrangement, the same data, in particular the same control program must be stored in the memory arrangement of the control unit in the series case and in the application case. For this reason, a control unit may be required to be switched from a series case to an application case without having to load other data into the memory arrangement. A switch from the application case back into the series case is not desirable and may even be impossible in order to prevent control units with control programs that have not been tested and approved by the manufacturer of the control units from being in circulation.

Conventional application units are characterized by an entry in a secret non-volatile memory area of the memory arrangement of the control unit. The secret memory area is located outside of the memory area of the memory arrangement to be programmed during a reprogramming of the control unit. Depending on whether the unit is a series unit or an application unit, the secret memory area is programmed with an appropriate entry immediately after the memory arrangement is programmed initially or is triggered by an appropriate method when the control unit is started up.

When the control unit is started up subsequently, then only the entry in the secret memory area is checked and a switch is made between a series case and an application case as a function of the entry, i.e., the check mechanisms are activated or deactivated. If no entry is present in the secret memory area, a series case is assumed and the check mechanisms are activated. Thus in conventional control units, it is possible to switch from a series case into an application case by writing an appropriate entry to the secret memory area.

It is, however, possible without great difficulty in the conventional control units to record the action of switching from a series case into an application case by writing to the secret memory area. Of particular interest is the entry which is stored in the secret memory area of an application unit. In the conventional methods for activating or deactivating data stored in a memory arrangement of a microcomputer system, the entry may be read from an application unit and used to switch additional control units into the application case with deactivated check mechanisms. Manipulated data may be stored in such manipulated application units and the manipulated data may then by executed or used.-It may not be possible to reliably protect the manipulated data against use.

SUMMARY OF THE INVENTION

Therefore, it is an object of the present invention to reliably and effectively prevent a utilization of the manipulated data in the event of a manipulation by unauthorized third parties of data stored in the memory arrangement.

To achieve this object, the invention may include the following procedure steps based on the method of the type cited above:

- a microcomputer-individual identifier is encoded or a signature of a microcomputer-individual identifier is stored in a specifiable memory area of the memory arrangement;
- when the microcomputer system is started up, the signature of the identifier is checked or the identifier is decoded; and
- as a function of the result of the check of the signature or of the decoded identifier, at least one part of the data is activated or deactivated.

According to the present invention, an entry may thus be made in a memory area of the memory arrangement and may be signed or encoded. The entry may be stored in any memory area of the memory arrangement. The encoded entry may be stored immediately after programming or reprogramming or it may be triggered by an appropriate method. The security of an example method of the present invention may be primarily provided by the signing or encoding of the entry with a secret key and not by the secrecy of the address of the memory area. When the memory arrangement is reprogrammed, the memory area may be erased but not written with the new data. The microcomputer system may be configured, for example, as a control unit for controlling and/or regulating motor vehicle functions.

When the microcomputer system is started up, the signature of the entry may be checked or the entry may be decoded. If no entry is present in the memory area or the check of the signature of the entry stored there or the decoding of the entry failed, a series case may be assumed and the check mechanisms may be activated. If, however, the check of the signature of the entry stored in the memory area or the decoding of the entry was successful, an application case may be assumed and the check mechanisms may be deactivated. According to the present invention, it may thus be possible to switch from a series unit to an application unit by storing an appropriate encoded entry in a specifiable memory area of the memory arrangement.

With an example method of the present invention, it may not only be possible to switch a control unit between a series case and an application case. Any desired parts of the data and accordingly any desired functions of a program may be activated or deactivated via the encoded entry into the memory area. Accordingly, vehicle manufacturers may, for example, implement various motor vehicle functions, e.g., various power outputs of the internal combustion engine by a specific intervention into the control program of a motor vehicle control unit. Any desired functions of a program may be activated or deactivated via software switches that may only be operated by authorized persons.

According to an example embodiment of the present invention, different identifiers may be stored in the memory area of the memory arrangement to activate or deactivate different parts of data. The different functions of a program may thus be activated or deactivated via the content of the memory area.

According to another example embodiment of the present invention, an identifier may be stored in different memory areas of the memory arrangement to activate or deactivate different parts of data. The different functions of a program may thus be activated or deactivated via the storage area in which the identifier is stored. Various identifiers may be stored in different memory areas in order to be able to activate or deactivate as many program functions as possible in this manner with as little memory space as possible.

According to an example embodiment of the present invention, the microcomputer-individual identifier may be signed or encoded using a private key accessible to only a limited number of persons and the signature of the identifier may be checked or the identifier may be decoded using a freely accessible public key. According to this example embodiment, the identifier may be signed or encoded according to an asymmetric encryption method. The asymmetric encryption method may also be identified as a public-key encryption method. Asymmetric encryption methods may include, for example, RSA (named after the developers of this method Ronald Rivest, Adi Shamir and Leonard Adleman; encryption by modular exponentiation $c=m^e$ mod n), LUC (similar to RSA; encryption by forming the Lucas sequence) or MNLN (Müller, Nöbauer, Lidl, Nöbauer; like RSA but polynomial $x^e$ is replaced by the Dickson polynomial) (see http://www.unimainz.de/~pommeren/DSVorlesung/KryptoBasis/asymmetrisch.html).

In the asymmetric encryption method, a hash value is formed from the control program to be signed and/or the data to be signed with the aid of a hash function to sign, for example, a control program for a control unit of a motor vehicle. A hash value is a type of checksum with particular properties which are a function of the hash function used. The hash value is encoded with the aid of a private key which is not freely accessible. The encoded hash value is identified as a signature. The signature is appended to the program to be signed and/or the data to be signed and transferred together with them to the vehicle control unit and stored there in the memory arrangement.

In the control unit, the signature is again decoded with the aid of a freely accessible public key. The decoded hash value may be obtained in this manner. Moreover, an additional hash value may be determined from the received control program and/or the received data with the aid of the same hash function which was used in connection with the encoding to determine the hash value. A check may then be made of whether the decoded hash value is the same as the additional hash value. If this is the case, the execution of the transferred control program or the utilization of the transferred data is released. Otherwise the execution of the control program or the utilization of the data is blocked.

The identifier may be stored in a memory area of the memory arrangement which is not changed during the utilization of the data. Thus there is neither read nor write access to the memory area during the execution of the program.

The identifier may be stored in a memory area which is erased when the memory arrangement is reprogrammed. Following a reprogramming, the microcomputer-individual identifier may therefore be stored signed or encoded in the specifiable memory area of the memory arrangement. For that purpose, the individual identifier of the microcomputer system as well as the correct encryption algorithm and the correct key may be known. An execution or utilization of the newly programmed data is not blocked only if the correct identifier with the correct key and algorithm has been stored signed or encoded in the memory area of the memory arrangement.

According to an example embodiment of the present invention, the signature of the identifier may be checked or the identifier may be decoded each time the microcomputer system is started up.

A serial number assigned to the microcomputer system, in particular a serial number assigned to the computing unit of the microcomputer system, may be stored signed or encoded in the specifiable memory area of the memory arrangement.

According to an example embodiment of the present invention, mechanisms to check for a manipulation of the data stored in the memory arrangement may be activated in the microcomputer system if no identifier is stored in the memory area of the memory arrangement or if the check of the signature of the identifier stored there or the decoding of the identifier stored there fails when the microcomputer system is started up. In such cases, a microcomputer system configured as a vehicle control unit may be switched into the series case. If the provided check mechanisms recognize a manipulation of the data, the execution or utilization of the newly programmed data may be blocked.

According to a further example embodiment of the present invention, mechanisms to check for a manipulation of the data stored in the memory arrangement may be deactivated in the microcomputer system if the check of the signature of the identifier stored in the memory area of the memory arrangement or the decoding of the identifier stored there is successful when the microcomputer system is started up. In this case a microcomputer system configured as a control unit for a motor vehicle may therefore be switched into an application case.

To achieve an object of the present invention, it may also be provided, on the basis of a microcomputer system of the type cited above, that a microcomputer-individual identifier be stored signed or encoded in a specifiable memory area of the memory arrangement;

an arrangement be provided to check the signature of the identifier or to decode the identifier when the microcomputer system is started up; and an arrangement be provided to activate or deactivate at least one part of the data stored in the memory arrangement of the microcomputer system as a function of the result of the check of the signature or of the decoded identifier.

According to an example embodiment of the present invention, the microcomputer system may be configured as a control unit for a motor vehicle for the controlling and/or regulating motor vehicle functions.

According to an example embodiment of the present invention, the microcomputer system may include an arrangement to implement an example method according to the present invention.

A computer program may be stored in the memory arrangement which may be capable of running on the computing unit and may be suitable to implement an example method according to the present invention.

The memory arrangement may be formed on the same semiconductor component as the computing unit. In such an on-chip memory, it may not be possible to manipulate the program memory or the data stored on it from the outside, as a result of which the microcomputer system may be additionally protected against manipulation of the data stored on the memory arrangement.

DETAILED DESCRIPTION

The present invention may include an example method to activate or deactivate at least one part of data stored in a memory arrangement of a microcomputer system. The microcomputer system may be configured, for example, as a control unit of a motor vehicle for the controlling and/or regulating specific motor vehicle functions. The data may be arranged, for example, as a control program, as limit values or as parameter values.

Activating or deactivating parts of the control program permits various functions of the control unit to switch on or off. In particular, the control unit may switch from a series case into an application case by activating or deactivating parts of the control program. In series units, mechanisms may be activated to check for a manipulation of the data stored in a memory arrangement of the control unit. These mechanisms may recognize manipulated data and the data may be blocked. The mechanisms may be configured in a very diverse manner. Many different check mechanisms are conventional. In certain situations, in particular during the development and testing phase of the control units, it may be necessary to deactivate the check mechanisms to allow various data to be stored rapidly and easily in the memory arrangement. A control unit with deactivated check mechanisms is described as an application unit.

Figure 1:
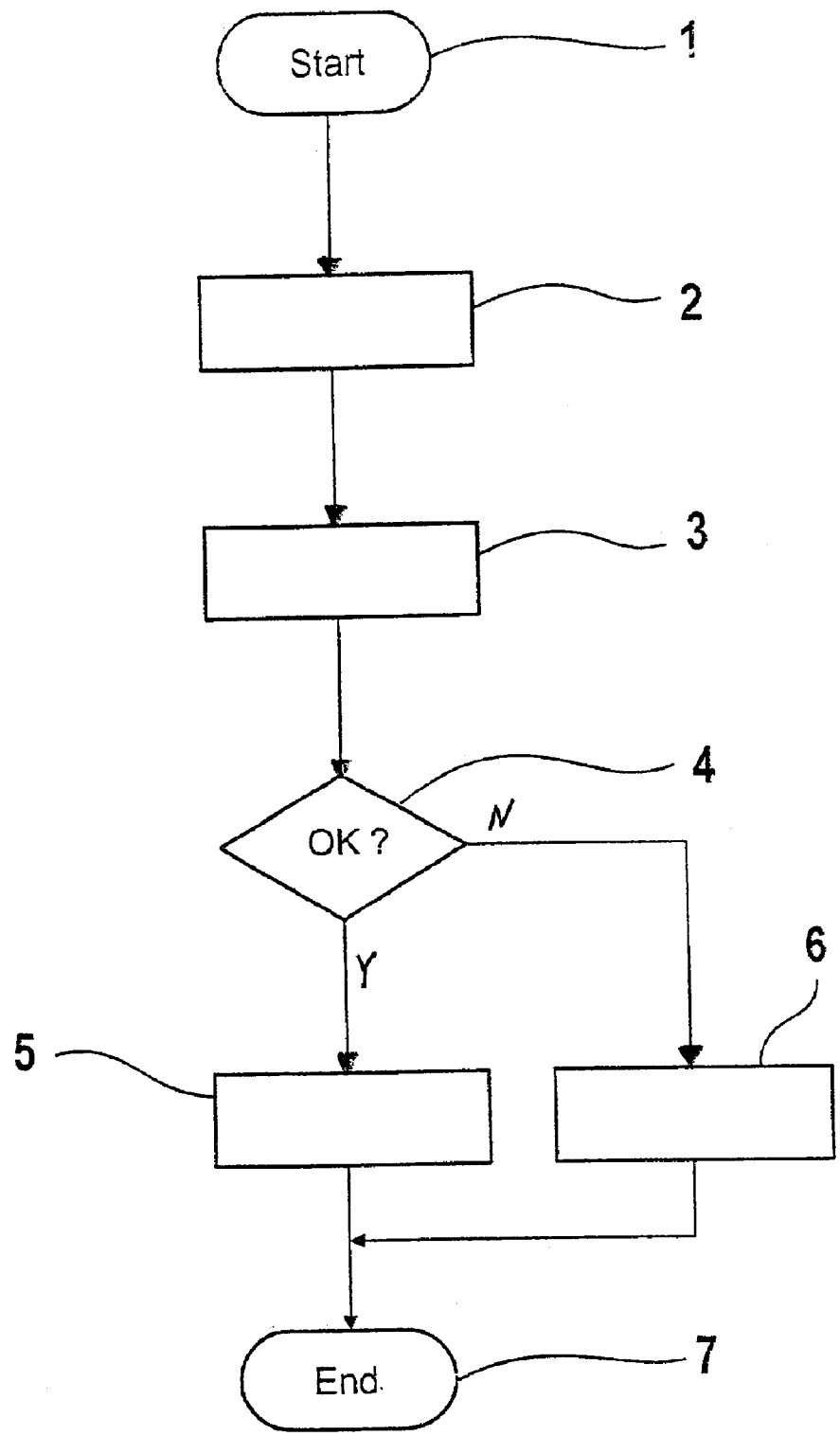
FIG. 1 is a flow diagram of an example method according to the present invention in accordance with an example embodiment.

The example method according to the present invention illustrated in FIG. 1 commences in a function block 1. In a function block 2, a microcomputer-individual identifier is signed or encoded according to an asymmetric encryption method with the aid of a private key. The signed or encoded identifier is identified as a certificate. The identifier is, for example, a serial number of the control unit or of a computing unit, in particular of a microprocessor of the control unit. The encoding of the identifier is described in detail with reference to FIG. 2. In a function block 3, the signature of the identifier is checked or the identifier is decoded with the aid of a public key when the control unit is started up. A query block 4 checks if the signature of the identifier is in order or if the decoded identifier coincides with the actual identifier of the microcomputer system. If this is the case, the control unit is an application unit and all check mechanisms are deactivated in a function block 5. If, however, no identifier is present in the memory area, the signature is defective or the decoded identifier does not coincide with the actual identifier, the control unit is a series unit and the check mechanisms are activated in a function block 6. In a future execution or utilization of the data stored in the memory arrangement, the data is checked for a manipulation. As a rule, manipulated data is recognized and blocked so that an execution or utilization is no longer possible. Thus in function blocks 3 to 6, a part of the control program is activated or deactivated as a function of the identifier. The method according to the invention is then terminated in a function block 7.

Figure 2:
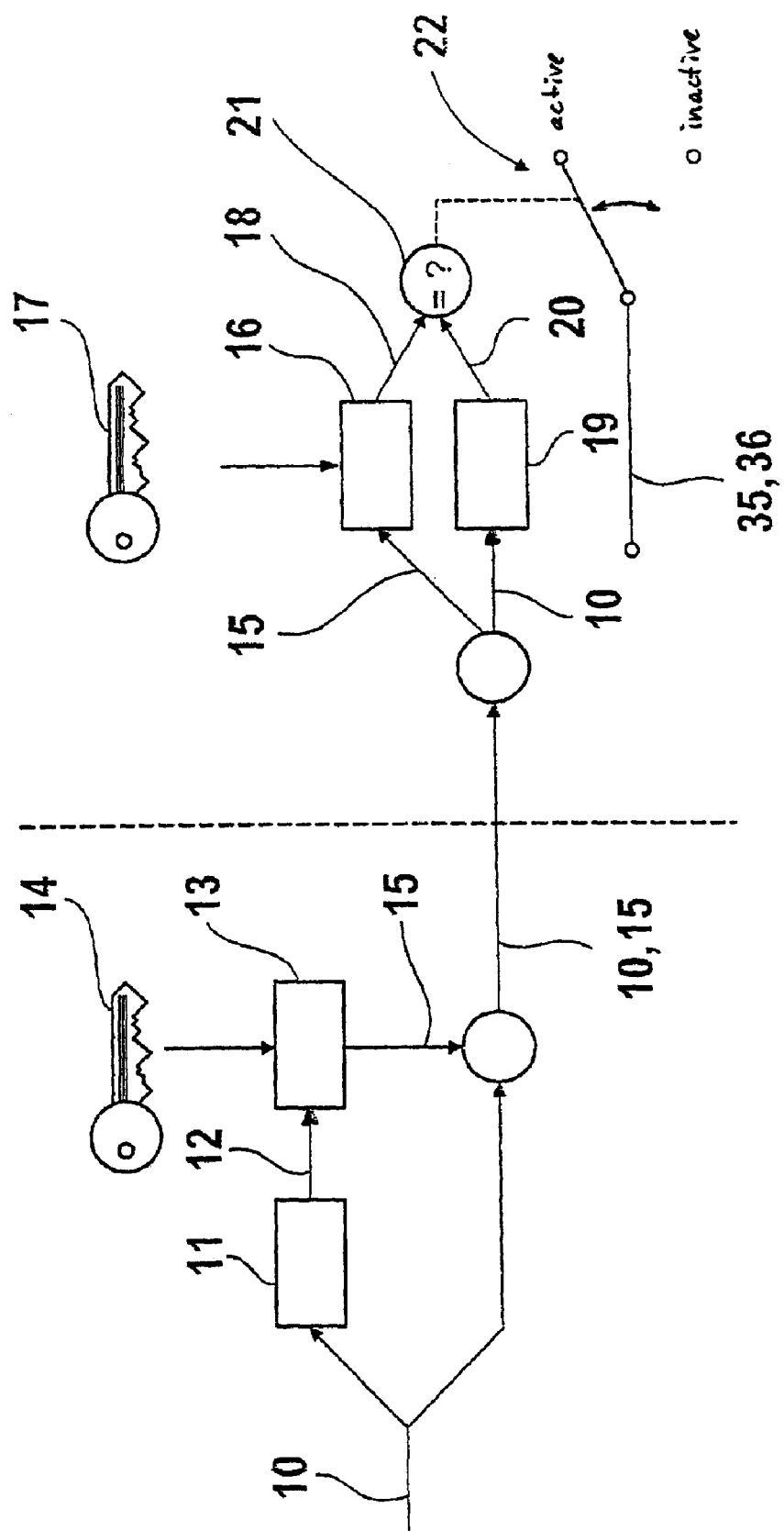
FIG. 2 is an additional flow diagram of the example method of FIG. 1.

An additional flow diagram of the method of FIG. 1 is shown in FIG. 2, in particular the signing or the encoding of the data and the check of the signature or of the decoding of the data being shown in detail. In a function block 11, a hash value 12 is formed with the aid of a hash function from a serial number 10 of the microprocessor of the control unit. Hash value 12 is then encoded in a function block 13 with the aid of private key 14. The encoded hash value is identified as signature 15. Signature 15 is appended to serial number 10; both are transferred via a suitable data interface to the control unit of a motor vehicle and stored there in a specified memory area of the memory arrangement.

In the control unit, serial number 10 is separated from signature 15. Signature 15 is decoded in a function block 16 with the aid of a public key 17. The decoded hash value is identified by reference symbol 18. In a function block 19, an additional hash value 20 is determined from serial number 10 with the aid of the same hash function which was also used in function block 11. A query block 21 checks if encoded hash value 18 is the same as determined hash value 20, i.e., if the encoded serial number is equal to actual serial number 10 of the microprocessor of the control unit. If this is the case, the control unit is switched into the application case. For this purpose, check mechanisms 35, 36 to check the data stored in the memory arrangement for manipulation are deactivated with the aid of a switching element 22 activated by query block 21. Otherwise, the control unit is switched into the series case by activating check mechanisms 35, 36 with the aid of switching element 22.

Private key 14 is only available to a limited number of persons. To increase the security, private key 14 may be managed in a trust center and serial number 10 may be signed with the aid of a signature server of the trust center. A corresponding method is described in U.S. patent application Ser. No. 10/145,299, entitled "Method of Protecting a Microcomputer System Against Manipulation of Data Stored in a Storage Assembly of The Microcomputer System," filed on May 13, 2002, which is expressly incorporated herein in its entirety by reference thereto.

As an alternative, identifier 10 may also be directly encoded with the aid of private key 14. The encoded identifier is transferred to the control unit and directly decoded there with the aid of public key 17. As a function of decoded identifier 10, at least one part of the data stored in the memory arrangement is then activated or deactivated in the control unit via switching element 22.

Figure 3:
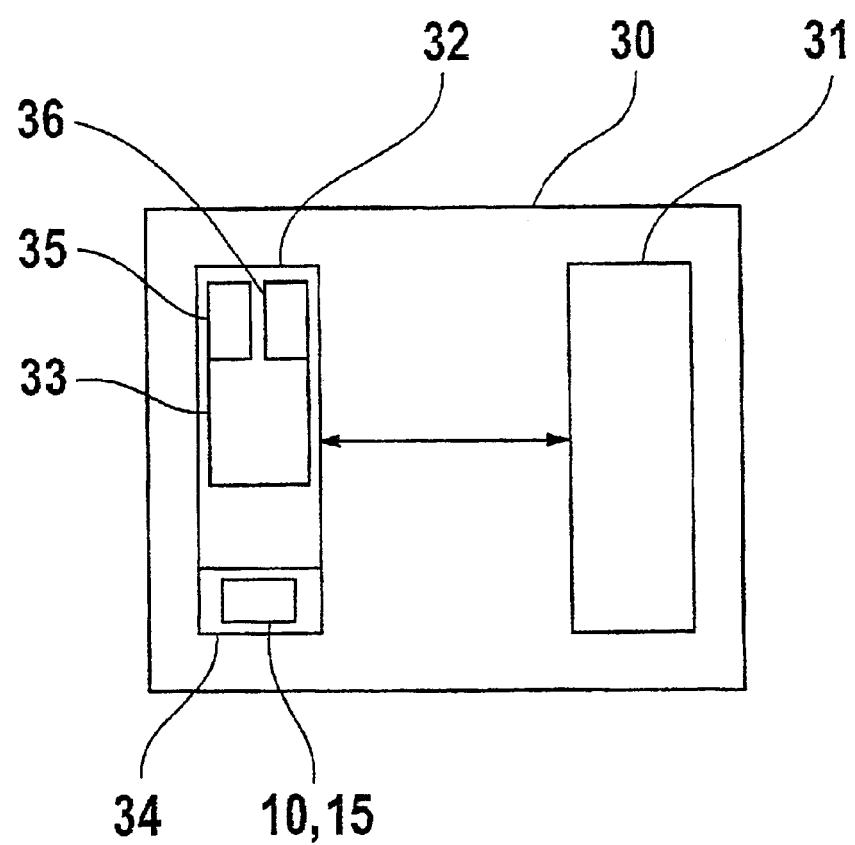
FIG. 3 illustrates a microcomputer system according to the present invention in accordance with an example embodiment.

In FIG. 3, a microcomputer system according to an example embodiment of the present invention is identified in its entirety with reference number 30. Microcomputer system 30 is configured as a control unit for a motor vehicle for the controlling and/or regulating motor vehicle functions. Control unit 30 includes a computing unit 31, which in particular is configured as a microprocessor, and a memory arrangement 32, in which various data 33, in particular a control program, limit values or parameter values, are stored. Memory arrangement 32 is formed on the same semiconductor component as microprocessor 31 (on-chip memory). A microcomputer-individual identifier 10, in particular a serial number of microprocessor 31 (CPU serial number), is stored signed or encoded in a specifiable memory area 34 of memory arrangement 32. Memory area 34 is automatically erased when memory arrangement 32 is reprogrammed; however, no new data are written to it. While data 33 is being utilized, i.e., during the execution of the control program, the contents of memory area 34 are not changed.

When control unit 30 is started up, signature 15 of identifier 10 is checked or identifier 10 is decoded. A suitable arrangement for this purpose is provided in control unit 30, which checks the contents of memory area 34 each time control unit 30 is started up. As a function of the contents of memory area 34, specific parts 35, 36 of control program 33 are activated or deactivated by a corresponding arrangement of control unit 30. Parts 35, 36 are, for example, check mechanisms via which the other data 33 stored in memory arrangement 32 may be checked for a manipulation.

If no identifier 10, 15 is stored in memory area 34 or if the check of signature 15 or the decoding of identifier 10 shows that identifier 10, 15 has been signed or encoded with an incorrect private key 14, control unit 30 is switched into a series case by activating parts 35, 36 of control program 33. Otherwise, control unit 30 is switched into an application case by deactivating parts 35, 36 of control program 33.

When control unit 30 is delivered, memory area 34 of memory arrangement 32 is empty. It is thus a series unit with active check mechanisms. If the series unit is to be switched into an application unit with inactive check mechanisms, the serial number of microprocessor 31 of control unit 30 is stored in memory area 34 signed or encoded. This requires the correct private key 14, which is only accessible to a limited number of persons.

A computer program may be stored in memory arrangement 32 which is capable of running on computing unit 31 and is suitable for the execution of the following procedure steps:

storage of the signed or encoded microcomputer-individual identifier 10, 15 in specifiable memory area 34 of memory arrangement 32;

a check of signature 15 of identifier 10 or a decoding of identifier 10 when microcomputer system 30 is started up; and activation or deactivation of at least one part of the data stored in memory arrangement 32 as a function of the contents of memory area 34.

The data stored in memory arrangement 32 is thus activated or deactivated as a function of the result of the check of signature 15 or as a function of decoded identifier 10, respectively.

What is claimed is:

1. A method for one of activating and deactivating at least one part of data stored in a memory arrangement of a microcomputer system, comprising the steps of:

one of encoding a microcomputer-individual identifier and storing a signature of the microcomputer-individual identifier in a specifiable memory area of the memory arrangement;

one of checking the signature of the identifier and decoding the identifier when the microcomputer system is started up; and one of activating and deactivating the at least one part of the data as a function of a result of the one of the checking of the signature and the decoding of the identifier;

wherein the one of the activating and the deactivating includes a switching of a control unit between a series case and an application case, and the switching is secured by using an asymmetric encryption process; and wherein the at least one part of the data includes at least a part of a program stored in the memory arrangement.

2. The method according to claim 1, further comprising the step of storing different identifiers in the memory area of the memory arrangement to one of activate and deactivate different parts of the data.

3. The method according to claim 1, further comprising the step of storing the identifier in different memory areas of the memory arrangement to one of activate and deactivate different parts of the data.

4. The method according to claim 1, further comprising the step of one of signing and encoding the microcomputer-individual identifier using a private key accessible to only a limited number of persons, wherein the one of the checking of the signature and the decoding of the identifier step is performed using a freely accessible public key.

5. The method according to claim 1, further comprising the step of storing the identifier in a memory area of the memory arrangement which is not changed during a utilization of the data.

6. The method according to claim 1, further comprising the step of storing the identifier in a memory area which is erased when the memory arrangement is reprogrammed.

7. The method according to claim 1, wherein the one of the checking the signature and the decoding the identifier step is performed each time the microcomputer system is started up.

8. The method according to claim 1, further comprising the step of storing a serial number assigned to the microcomputer system in one of a signed and encoded manner in the specifiable memory area.

9. The method according to claim 8, wherein the serial number is assigned to a computing unit of the microcomputer system.

10. The method according to claim 1, further comprising the step of activating mechanisms in the microcomputer system to check for a manipulation of the data if one of:

no identifier is stored in the specifiable memory area; and one of the checking of the signature and the decoding of the identifier steps fails when the microcomputer system is started up.

11. The method according to claim 1, further comprising the step of deactivating mechanisms in the microcomputer system to check for a manipulation of the data if the one of the checking of the signature and the decoding of the identifier step is successful when the microcomputer system is started up.

12. A microcomputer system, comprising:

a computing unit;

a memory arrangement configured to store data, the memory arrangement including a specifiable memory area;

a microcomputer-individual identifier stored in one of a signed and an encoded manner in the specifiable memory area;

a first arrangement configured to one of check a signature of the identifier and decode the identifier when the microcomputer system is started up; and a second arrangement configured to one of activate and deactivate at least one part of the data as a function of a result of the check of the signature and the decoded identifier; and wherein the one of the activating and the deactivating includes a switching of a control unit between a series case and an application case, and the switching is secured by using an asymmetric encryption process; and wherein the at least one tart of the data includes at least a part of a program.

13. The microcomputer system according to claim 12, wherein the computing unit includes a microprocessor.

14. The microcomputer system according to claim 12, wherein the microcomputer system includes a control unit for a motor vehicle configured to at least one of control and regulate motor vehicle functions.

15. The microcomputer system according to claim 12, wherein the microcomputer system includes a third arrangement configured to perform a method for one of activating and deactivating at least one part of data stored in the memory arrangement, the method including the steps of:

one of encoding the microcomputer-individual identifier and storing a signature of the microcomputer-individual identifier in the specifiable memory area of the memory arrangement;

one of checking the signature of the identifier and decoding the identifier when the microcomputer system is started up;

one of activating and deactivating the at least one part of the data as a function of a result of the one of the checking of the signature and the decoding of the identifier; and storing different identifiers in the memory area of the memory arrangement to one of activate and deactivate different parts of the data.

16. The microcomputer system according to claim 12, wherein the memory arrangement includes a computer program capable of running on the computing unit and configured to perform a method for one of activating and deactivating at least one part of data stored in the memory arrangement, the method including the steps of:

one of encoding the microcomputer-individual identifier and storing a signature of the microcomputer-individual identifier in the specifiable memory area of the memory arrangement;

one of checking the signature of the identifier and decoding the identifier when the microcomputer system is started up; and one of activating and deactivating the at least one part of the data as a function of a result of the one of the checking of the signature and the decoding of the identifier.

17. The microcomputer system according to claim 12, wherein the memory arrangement is arranged on a same semiconductor component as the computing unit.

* * * * *